Feb. 29, 1944.  R. W. LUCE  2,343,067
MOTION TRANSMITTING DEVICE
Filed Feb. 18, 1941  2 Sheets-Sheet 2
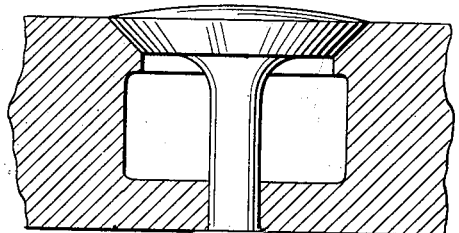
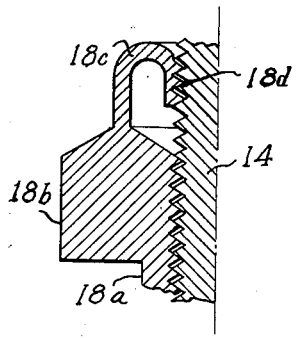
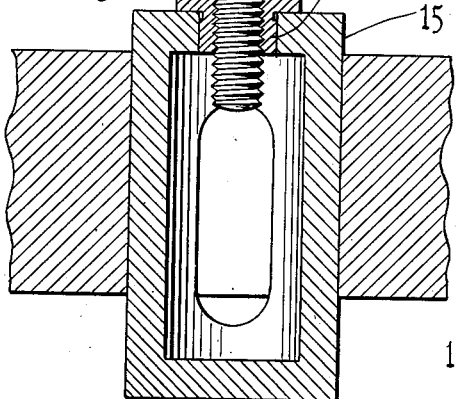
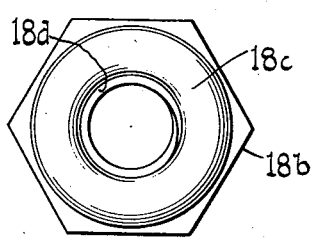
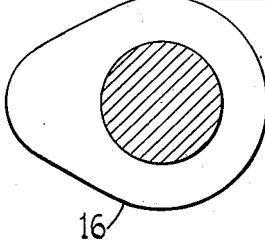
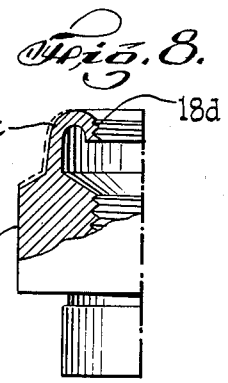
INVENTOR.
RICHARD W. LUCE
BY George T. Gill
ATTORNEY Patented Feb. 29, 1944

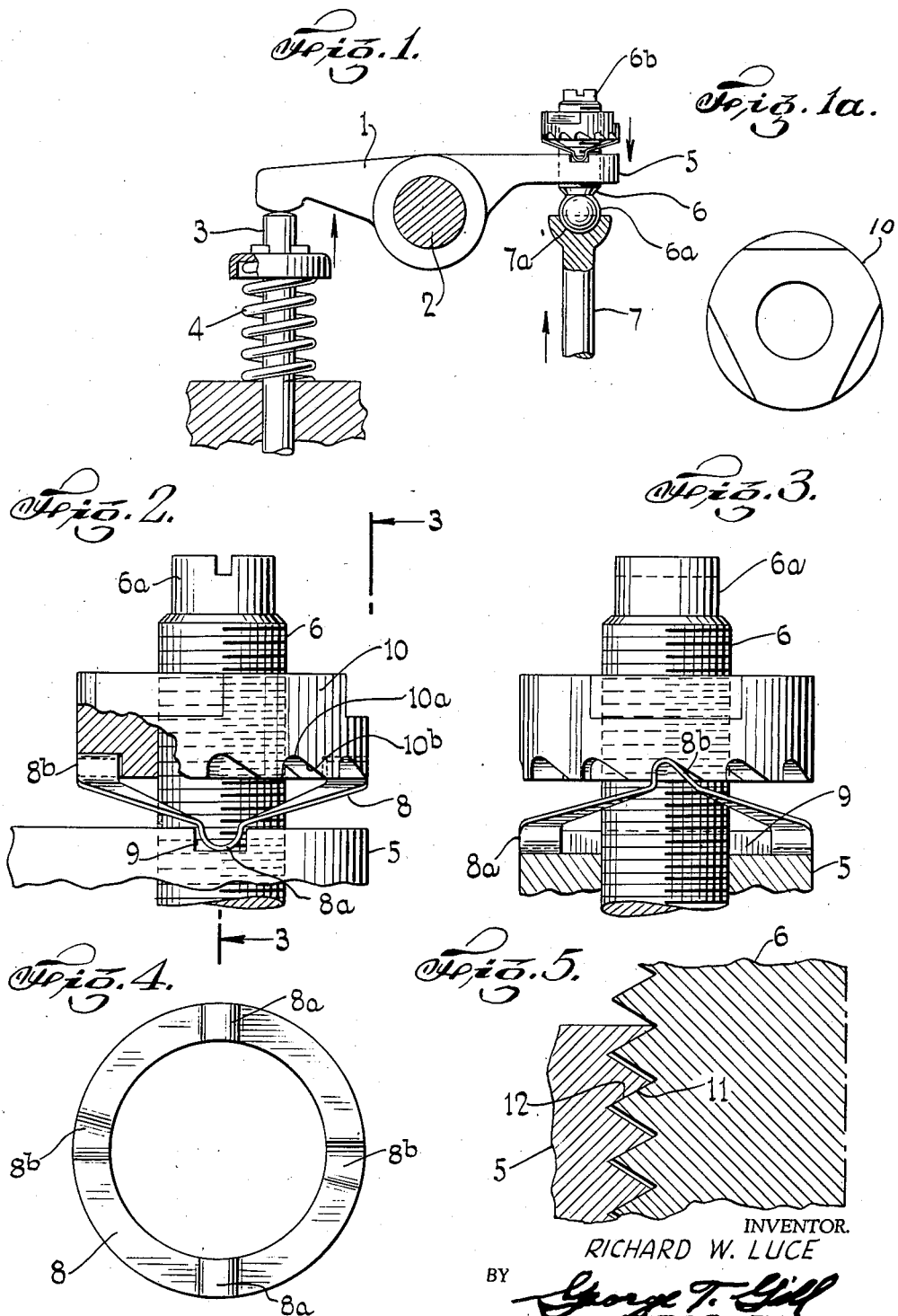

2,343,067

UNITED STATES PATENT OFFICE 2,343,067

MOTION TRANSMITTING DEVICE

Richard W. Luce, Southport, Conn.

Application February 18, 1941, Serial No. 379,408

7 Claims. (Cl. 123—90)

The invention herein disclosed relates to a motion transmitting device that includes interengaging theaded members through which motion is transmitted and which coact in effecting and maintaining a variation in the effective length of the device.

A common example of a motion transmitting device wherein a variation in the effective length needs to be maintained is the arrangement for operating the valve of an internal combustion engine. In general, two elements in the motion transmitting train of the valve mechanism are connected together through threaded members that are maintained in adjusted relation by a check-nut. Because of the fact that in some such arrangements, those utilized in the L-head type of engine, both threaded elements are free to rotate, it is difficult to make the adjustments that are necessary every so often and because of the tolerances in commercial threads, it is difficult to secure an accurate adjustment for the drawing up of the check-nut disturbs the adjustment.

By the invention herein disclosed, there is provided a device of this kind in which the threaded elements are preloaded to effect a frictional engagement between the surfaces of the threads through which the effective length is adjusted and maintained. With this arrangement, the tolerances in the interengaging threads is taken up and the frictional contact between the surfaces of the threads is sufficient to resist relative movement between the threaded elements.

Two such devices are disclosed, by way of examples of embodiments of the invention, in the accompanying drawings and described in detail below. The drawings include:

Fig. 1 which is a side elevation, in part section, of a tappet for an internal combustion engine having overhead valves with the arrangement embodying this invention applied thereto;

Fig. 1A is a plan view of a nut used in the arrangement illustrated in Fig. 1;

Fig. 2 which is an enlarged, fragmentary elevation of the same;

Fig. 3 which is an enlarged fragmentary elevation of the same, partly in section, taken on the line 3—3 of Fig. 2;

Fig. 4 which is an enlarged plan of a spring collar;

Fig. 5 which is a fragmentary section illustrating the pre-loading of the threads;

Fig. 6 which is a sectional elevation of the valve mechanism for an L-head internal combustion engine;

Fig. 7 which is a plan of a part thereof;

Fig. 8 which is a semi-elevation, partly in section, of the same; and

Fig. 9 is a fragmentary sectional elevation illustrating the preloading of the threads in the arrangement of Figs. 6 to 8.

In Figs. 1 to 5 of the drawings, the invention is illustrated as embodied in a tappet for an overhead valve of an internal combustion engine. In such constructions, there is a rocker arm 1 pivotally mounted between its ends on a shaft 2. One end of the rocker arm is positioned to engage the end of the valve stem 3 and when the rocker arm is rocked press the valve stem down to open the valve. The valve is closed upon reverse movement of the rocker arm by a spring 4 provided for that purpose. On the end of the rocker arm, there is formed a boss 5 that is drilled and tapped to receive a threaded rod 6 having a ball 6a formed on one end and a reduced slotted portion 6b on the other end. The ball 6a is received in a ball cup 7a formed on the end of a valve rod 7 that is reciprocated by a cam (not shown) in the usual way.

The threaded rod 6 is utilized for adjusting the valves. By adjusting this rod, the effective length of the valve rod is changed and the desired clearance between the rocker arm and the valve stem is attained. This adjustment is a very important one for the proper functioning of the motor. Heretofore, the rod 6 has been held in the adjusted position by a jamb nut screwed on over the reduced end of the rod 6 and jambed against the surface of the boss 5. To adjust a valve it was necessary for the mechanic, while the motor was running, to adjust the rod 6 with a screw-driver until the proper clearance, determined by placing a clearance gauge between the rocker arm and the valve stem, is obtained. He then had to hold the rod 6 in the adjusted position while he put the clearance gauge down, picked up a wrench and tightened the jamb nut against the boss. In performing these operations, it frequently happened that the adjusting rod 6 moved from the adjusted position by the very act of drawing the jamb nut against the boss and thus taking up the tolerance between the threads. When this occurs, the whole operation has to be repeated.

These difficulties are avoided with the arrangement of this invention. The rod 6 is preloaded to effect, at all times, a frictional engagement between the surfaces of the threads of the rod 6 and the boss 5. This preloading is effected by an axial force which acts in the same direction as the force of the spring 4. That is to say the force of the spring 4 and the preloading force are in the same direction and cumulative.

The arrangement by which this preloading of the threaded elements is effected includes a spring collar or washer 8 that surround the rod 6. This spring washer is sinusoidal and includes two pairs of oppositely extending, axially spaced projections or detents 8a and 8b. The detents of each pair are diametrically opposite each other and the detents 8a are angularly spaced through ninety degrees from the adjacent detents 8b.

The detents 8a are received in a channel-shaped slot 9 milled in the face of the boss 5 and extending diametrically of the boss. The detents 8b cooperate with arcuate slots 10a with a lead-in 10b in the face of a nut 10 that is threaded on the rod 6. Normally the slots 10a are angularly spaced through angles of thirty degrees. When the nut 10 is threaded on the rod 6, the rod 6 is held against rotation with the nut. As the nut is threaded on the rod 6 it compresses the spring washer 8, the detents 8b on the washer slipping from one pair of diametrically opposite slots 10a to the next as the nut is rotated on the rod and the washer compressed. The configuration of the slots 10a and the lesser depth thereof as compared to the rectangular configuration and greater depth of the slot 9 in the boss 5 causes the detents 8b to slip out of the slots 10a as the nut rotates while the detents 8a remain in the slot 9. By compressing the spring washer 8 in this manner a greater or lesser amount any desired preloading force, within the limits of the spring washer, may be impressed on the rod 6. Preferably, the nut 10 is of an odd shape, having three flats for example, and requires an unusual wrench so that once the preloading force is set, in the initial assembly, it will not be varied by the repair man.

The effect of the preloading force as applied by the spring washer 8 is illustrated in Fig. 5. The preloading force is exerted axially and the upper surface 11 of the thread on the rod is drawn into surface engaging and frictional contact with the lower surface 12 of the thread in the boss. It is to be noted that the thread tolerance is thus taken up in the same direction as the forces that act between the boss and the rod 6; these forces being indicated by the arrows in Fig. 1. The preloading force is such that the force of the friction between the surfaces of the threads of the rod and the boss is sufficient to prevent the rod from turning in the boss under the force resulting from vibration and shock incident to the operation of the valve.

To adjust the effective length of the valve rod 7 and so the clearance between the tappet and the valve rod 3, it is only necessary to turn the rod 6 with a screw driver. When the desired adjustment is thus attained nothing more need be done, and by virtue of this fact and the fact that the tolerance in the threads of the boss 5 and rod 6 is taken up by the preloading force, a much more accurate and in fact a micrometer adjustment may be obtained. The preloading force once adjusted does not vary for the nut 10 does not rotate with the rod 6 as it is locked to the boss 5 through the detents on the spring washer 8.

A similar preloading arrangement for the valves of an L-head internal combustion engine is illustrated in Figs. 6 to 8 of the drawings. In this arrangement the valve stem 13 is in line with the valve rod 14 which is connected to a fitting 15 that is acted upon by a cam 16. The cam moves the valve rod to open the valve against the action of a spring 17. At the valve end of the fitting 15 there is provided an opening into which the knurled or ribbed collar 18a of a preloading device 18 is forced.

The preloading device includes the collar or extension 18a an internally tapped, hexagonal body portion 18b, a resilient portion 18c and a smaller tapped portion 18d axially spaced from the body portion. The resilient portion 18a is a continuous, thin wall section that unites the two tapped portions and the thickness of which is slightly less than the thickness required to receive and hold a thread together. Before the threaded valve rod 14 is entered in the preloading device, the two tapped portions, 18b and 18d, are arranged with respect to each other, axially, so that the threads thereof, while of the same pitch, are axially out of phase, the preloading device being axially contracted an amount slightly less than one-half of the pitch of the thread. When the valve rod is entered in the device it expands the resilient portion to bring the threads of the two tapped portions into coincidence with the thread on the valve rod. In this expansion of the preloading device, the resilient portion partakes of a bending action and its resilience is such that it can take up the commercial thread tolerances without taking a set and so causes the surfaces of the threads of the body portion of the preloading device and the valve rod 14 to be drawn into surface engaging and frictional contact.

Since the spring portion 18c tends, when the valve rod 14 is in the preloading device, to draw the two tapped portions together, the upper surface of the thread of the body portion of the preloading device is drawn into surface engaging and frictional contact with the lower surface of the thread on the valve rod. Thus, the tolerance in the threads is taken up in the same direction as would be effected by the application of force to raise the valve. The frictional force thus effected between the threads is sufficient to prevent the valve rod 14 from rotating relative to the preloading device under forces due to vibration and shock.

To adjust the clearance between the valve rod and valve stem, it is only necessary to rotate the valve stem relative to the preloading device. When the desired adjustment is thus obtained nothing further need be done.

From the foregoing, taken in connection with the accompanying drawings, it will be seen that by this invention there is provided a motion transmitting arrangement or device that comprises male and female threaded members for the purpose of transmitting motion from one to the other and which coact in effecting and maintaining a variation in the effective length of the device, together with a preloading arrangement that effects a frictional engagement between the threads thereof. The arrangement when utilized on valve mechanism of an internal combustion engine saves much time in the initial and subsequent adjustments of the valves and permits a more accurate and even a micrometer adjustment of the valves.

It will be obvious that various changes may be made by those skilled in the art in the details of the embodiments of the invention illustrated in the drawings and described in detail above within the principle and scope of the invention as expressed in the appended claims.

I claim:

1. A device of the kind described comprising in combination male and female threaded members for transmitting motion from one to the other, said members coacting in affecting variations in the effective length of said device and maintaining the effective length and said female member including two axially spaced internally threaded sections of equal diameter and having threads of substantially the same pitch, and a resilient section therebetween, maintaining the two internally threaded sections relatively fixed with respect to rotation about the axis and preloading, substantially axially thereof, the male and female threaded members to effect a frictional engagement between the surfaces of the threads thereof in the direction of the force applied for effecting movement of the members.

2. A device of the kind described comprising in combination male and female threaded members for transmitting motion from one to the other, said members coacting in affecting variations in the effective length of said device and maintaining the effective length and said female member including two axially spaced, internally threaded sections of equal diameter and having threads of substantially the same pitch, and a resilient section therebetween and connected thereto to maintain the two internally threaded sections relatively fixed with respect to rotation about the axis and preloading, substantially axially thereof, the male and female threaded members to effect a frictional engagement between the surfaces of the threads thereof in the direction of the force applied for effecting movement of the members.

3. A device of the kind described comprising in combination male and female threaded members for transmitting motion from one to the other, said members coacting in affecting variations in the effective length of said device and maintaining the effective length, said female member including two axially spaced independent, internally threaded sections of equal diameter and having threads of substantially the same pitch and a resilient section therebetween for preloading, substantially axially thereof, the male and female threaded members to effect a frictional engagement of the threads thereof in the direction of the force applied for effecting movement of the members, and interengaging means on said resilient section and each of said internally threaded sections for maintaining the two threaded sections relatively fixed with respect to rotation about the axis.

4. A device of the kind described comprising in combination male and female threaded members for transmitting motion from one to the other, said members coacting in affecting variations in the effective length of said device and maintaining the effective length, said female member including three integrally united sections comprising two axially spaced internally threaded sections of equal diameter and having threads of the same pitch and a resilient section between and uniting the internally threaded sections and acting to preload the male and female members, axially thereof, to effect a frictional engagement between the threads thereof.

5. A device of the kind described comprising in combination male and female threaded members for transmitting motion from one to the other, one of said members being a rocker arm and the other a rod, said members coacting in affecting variations in the effective length of the rod and maintaining the effective length, and resilient means preloading the members and acting substantially axially thereof to effect a frictional engagement between the surfaces of the threads thereof.

6. A device of the kind described comprising in combination male and female threaded members for transmitting motion from one to the other, one of said members being a rocker arm and the other a rod, said members coacting in affecting variations in the effective length of the rod and maintaining the effective length and adjustable resilient means preloading the members and acting substantially axially thereof to effect a frictional engagement between the surfaces of the threads thereof.

7. A device of the kind described comprising in combination aligned male and female threaded members for transmitting motion one to the other, said members coacting in affecting variations in the effective length of said device and maintaining the effective length, said female member including three integrally united sections comprising two axially spaced internally threaded sections and a resilient section uniting the threaded sections and preloading the male and female members to effect a frictional engagement between the surfaces of the threads thereof.

RICHARD W. LUCE.